(12) United States Patent
Carr et al.

(10) Patent No.: US 10,072,516 B2
(45) Date of Patent: Sep. 11, 2018

(54) CLAMPED VANE ARC SEGMENT HAVING LOAD-TRANSMITTING FEATURES

(71) Applicant: United Technologies Corporation, Hartford, CT (US)

(72) Inventors: Jesse M. Carr, Hartford, CT (US); Bryan P. Dube, Columbia, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 420 days.

(21) Appl. No.: 14/838,407

(22) Filed: Aug. 28, 2015

(65) Prior Publication Data

US 2016/0084096 A1    Mar. 24, 2016

Related U.S. Application Data

(60) Provisional application No. 62/054,520, filed on Sep. 24, 2014.

(51) Int. Cl.
*F01D 9/04*    (2006.01)
*F01D 25/28*    (2006.01)
*F02C 3/04*    (2006.01)
*F01D 25/24*    (2006.01)

(52) U.S. Cl.
CPC ............. *F01D 9/041* (2013.01); *F01D 9/042* (2013.01); *F01D 25/246* (2013.01); *F01D 25/28* (2013.01); *F02C 3/04* (2013.01); *F05D 2220/32* (2013.01); *F05D 2240/12* (2013.01); *F05D 2240/80* (2013.01); *Y02T 50/672* (2013.01); *Y02T 50/673* (2013.01)

(58) Field of Classification Search
CPC .................................. F01D 9/042; F01D 9/045

USPC .................... 415/191, 209.3, 209.4
See application file for complete search history.

(56) References Cited

U.S. PATENT DOCUMENTS

| 2,609,176 | A |   | 9/1952 | Purvis |
|---|---|---|---|---|
| 4,050,843 | A |   | 9/1977 | Needham et al. |
| 5,634,766 | A | * | 6/1997 | Cunha .................. F01D 5/187 |
|   |   |   |   | 415/115 |

(Continued)

FOREIGN PATENT DOCUMENTS

| EP | 1041249 | 10/2000 |
|---|---|---|
| JP | S63223302 | 9/1988 |
| WO | 03001036 | 1/2003 |

OTHER PUBLICATIONS

European Search Report for European Application No. 15186400 dated Feb. 1, 2016.

*Primary Examiner* — Timothy L Maust
(74) *Attorney, Agent, or Firm* — Carlson, Gaskey & Olds, P.C.

(57) ABSTRACT

A vane arc segment includes a radially inner and outer platforms and an airfoil mechanically clamped between the platforms. The airfoil has an airfoil section that extends radially between radially inner and outer fairing platforms. At least one of the fairing platforms includes forward and aft sides, circumferential sides, and a gas path side and an opposed radial side. The radial side includes a plurality of protrusions that have faces that are oriented substantially normal to, respectively, radial, tangential, and axial load transmission directions of the airfoil such that the faces, respectively, primarily bear radial, tangential, and axial load transmissions of the airfoil.

16 Claims, 4 Drawing Sheets

(56) References Cited

U.S. PATENT DOCUMENTS

| | | | | |
|---|---|---|---|---|
| 5,788,456 | A | * | 8/1998 | Maier ............... F01D 9/042 |
| | | | | 29/889.22 |
| 5,931,636 | A | * | 8/1999 | Savage ............. F01D 17/141 |
| | | | | 415/115 |
| 6,164,903 | A | * | 12/2000 | Kouris ............... F01D 9/04 |
| | | | | 415/135 |
| 6,200,092 | B1 | * | 3/2001 | Koschier ............. F01D 5/146 |
| | | | | 415/191 |
| 6,514,041 | B1 | | 2/2003 | Matheny |
| 7,093,359 | B2 | * | 8/2006 | Morrison ............. F01D 5/282 |
| | | | | 264/257 |
| 7,104,756 | B2 | * | 9/2006 | Harding ............. F01D 5/189 |
| | | | | 416/233 |
| 7,238,003 | B2 | | 7/2007 | Synnott et al. |
| 7,922,444 | B2 | * | 4/2011 | Propheter-Hinckley ............... |
| | | | | F01D 11/005 |
| | | | | 29/888.3 |
| 8,356,981 | B2 | * | 1/2013 | Cooke ............... F01D 9/042 |
| | | | | 416/214 A |
| 8,393,867 | B2 | * | 3/2013 | Chon ............... F01D 5/188 |
| | | | | 416/1 |
| 8,834,109 | B2 | * | 9/2014 | Propheter-Hinckley ............... |
| | | | | F01D 9/042 |
| | | | | 415/191 |
| 9,816,387 | B2 | * | 11/2017 | Carr ............... F01D 9/042 |
| 2006/0228211 | A1 | | 10/2006 | Vance |
| 2008/0279679 | A1 | | 11/2008 | Morrison |
| 2012/0039716 | A1 | | 2/2012 | Ahmad et al. |
| 2013/0004296 | A1 | | 1/2013 | Propheter-Hinckley et al. |

\* cited by examiner

CLAMPED VANE ARC SEGMENT HAVING LOAD-TRANSMITTING FEATURES

CROSS-REFERENCE TO RELATED APPLICATION

The present disclosure claims priority to U.S. Provisional Patent Application No. 62/054,520, filed Sep. 24, 2014.

STATEMENT REGARDING FEDERALLY SPONSORED RESEARCH OR DEVELOPMENT

This invention was made with government support under contract number FA8650-09-D-2923-0021 awarded by the United States Air Force. The government has certain rights in the invention.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

A vane arc segment according to an example of the present disclosure includes radially inner and outer platforms and an airfoil mechanically clamped between the platforms. The airfoil has an airfoil section that extends radially between radially inner and outer fairing platforms. At least one of the fairing platforms includes forward and aft sides, circumferential sides, and a gas path side and an opposed radial side. The radial side includes a plurality of protrusions that have faces that are oriented substantially normal to, respectively, radial, tangential, and axial load transmission directions of the airfoil such that the faces, respectively, bear radial, tangential, and axial load transmissions of the airfoil.

In a further embodiment of any of the foregoing embodiments, the plurality of protrusions includes first and second rails that extend circumferentially along the forward and aft sides.

In a further embodiment of any of the foregoing embodiments, the plurality of protrusions includes a tab that extends axially from the first rail.

In a further embodiment of any of the foregoing embodiments, the tab extends along a central tab axis that is substantially perpendicular to the first rail such that the tab has circumferential tab faces that are oriented substantially normal to the tangential load transmission direction.

In a further embodiment of any of the foregoing embodiments, the tab includes a radial tab face that is oriented substantially normal to the radial load transmission direction.

In a further embodiment of any of the foregoing embodiments, the first and second rails are axially offset from, respectively, edges of the forward and aft sides.

In a further embodiment of any of the foregoing embodiments, the first and second rails include radial rail faces that are oriented substantially normal to the radial load transmission direction and axial rail faces that are oriented substantially normal to the axial load transmission direction.

In a further embodiment of any of the foregoing embodiments, the airfoil section includes a hollow interior and a rib that extends in the hollow interior and protrudes from the hollow interior.

In a further embodiment of any of the foregoing embodiments, the rib includes axial rib faces that are oriented substantially normal to the axial load transmission direction.

In a further embodiment of any of the foregoing embodiments, the rib includes a radial rib face that is oriented substantially normal to the radial load transmission direction.

In a further embodiment of any of the foregoing embodiments, the plurality of protrusions includes a first elongated tab that extends in radial alignment with a convex side of the airfoil section.

In a further embodiment of any of the foregoing embodiments, the first elongated tab includes a radial tab face that is oriented substantially normal to the radial load transmission direction.

In a further embodiment of any of the foregoing embodiments, the plurality of protrusions includes a second elongated tab that is substantially perpendicular to the first elongated tab.

In a further embodiment of any of the foregoing embodiments, the plurality of protrusions include first and second rails that extend circumferentially along the forward and aft sides, first and second mateface rails that extend axially along the circumferential sides, and a tab that extends circumferentially toward the airfoil section from one of the first and second mateface rails.

In a further embodiment of any of the foregoing embodiments, the tab includes a radial tab face that is oriented substantially normal to the radial load transmission direction and an axial tab face that is oriented substantially normal to the axial load transmission direction.

A vane assembly according to an example of the present disclosure includes a plurality of vane arc segments that are arrangeable into an annular configuration. Each of the vane arc segments includes radially inner and outer platforms, and an airfoil mechanically clamped between the platforms. The airfoil has an airfoil section that extends radially between radially inner and outer fairing platforms. At least one of the fairing platforms includes forward and aft sides, circumferential sides, and a gas path side and an opposed radial side. The radial side includes a plurality of protrusions that have faces that are oriented substantially normal to, respectively, radial, tangential, and axial load transmission directions of the airfoil such that the faces, respectively, bear radial, tangential, and axial load transmissions of the airfoil.

A gas turbine engine according to an example of the present disclosure includes a core engine that includes a compressor section, a combustor in fluid communication with the compressor section, a turbine section in fluid communication with the combustor, and a vane assembly that includes a plurality of vane arc segments arranged in an annular configuration in a core gas path of the core engine. Each of the vane arc segments includes radially inner and outer platforms and an airfoil mechanically clamped between the platforms. The airfoil has an airfoil section that extends radially between radially inner and outer fairing platforms. At least one of the fairing platforms includes forward and aft sides, circumferential sides, and a gas path side and an opposed radial side. The radial side includes a plurality of protrusions that have faces that are oriented substantially normal to, respectively, radial, tangential, and axial load transmission directions of the airfoil such that the faces, respectively, bear radial, tangential, and axial load transmissions of the airfoil.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
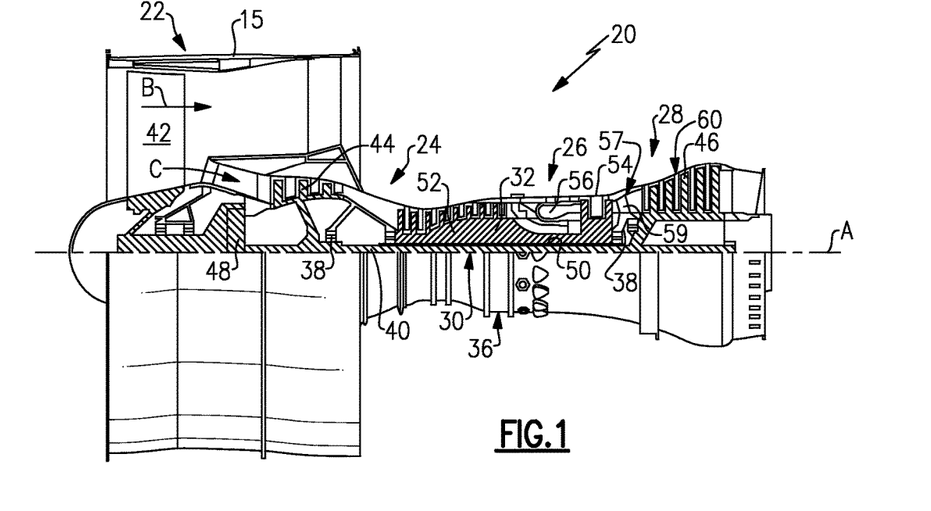
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ °R)/(518.7°R)]^{0.5}$. The "Low corrected fan tip speed" as disclosed herein according to one non-limiting embodiment is less than about 1150 ft/second.

The engine 20 also includes a vane assembly 60. In this example, the vane assembly 60 is in the turbine section 28 of the engine 20. However, it is to be understood that the examples herein may also be applicable to other sections of the engine 20.

Figure 2:
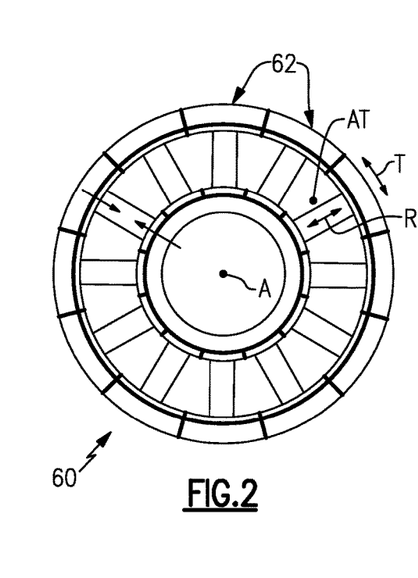
FIG. 2 illustrates an example vane assembly that has a plurality of vane arc segments.

FIG. 2 shows an isolated, axial view of select portions of the vane assembly 60. In this example, the vane assembly 60 includes a plurality of vane arc segments 62 that are arranged, or are at least arrangeable, into an annular configuration about the central engine axis A.

Figure 3:
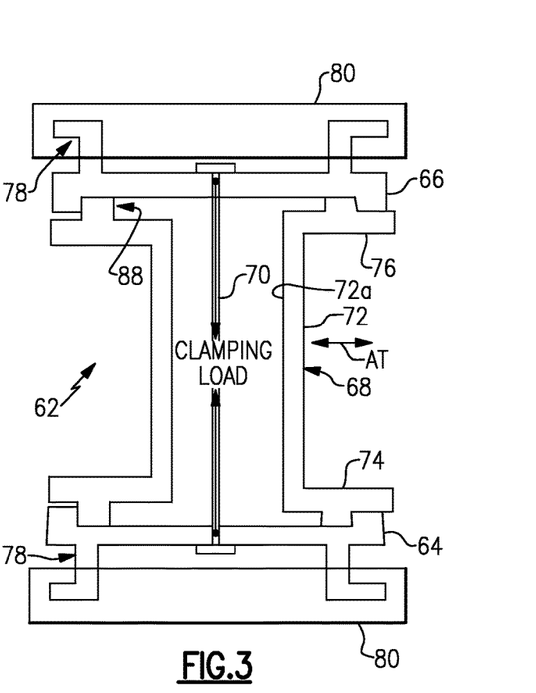
FIG. 3 illustrates a representative one of the vane arc segments of FIG. 2.

FIG. 3 shows an example of a representative one of the vane arc segments 62. In general, the vane arc segment 62 is a clamped arrangement that includes a radially inner platform 64, a radially outer platform 66, and an airfoil 68 mechanically clamped between the platforms 64/66. In this example, a tensioned tie rod or spar, schematically represented at 70, extends through the inner platform 64, the airfoil 68, and the outer platform 66 to mechanically clamp the airfoil 68 between the platforms 64/66. As can be appreciated, the examples herein are not limited to arrangements that use the tie rod 70 and other mechanisms of mechanical clamping in addition to, or in place of, the tie rod 70 can be used to mechanically trap the airfoil 68.

The airfoil 68 includes an airfoil section 72 that extends radially between radially inner and outer fairing platforms 74/76. The airfoil section 72 includes a hollow interior 72a through which the tie rod 70 extends. The fairing platforms 74/76 radially bound a portion of the core gas path C of the engine 20.

Loads from aerodynamic forces, clamping loads, or the like on the airfoil 68 can be transmitted from the airfoil 68 into the platforms 64/66. As an example, the platforms 64/66 can include mechanical attachment features, generally represented at 78, such as mechanical hooks, for affixing the vane arc segment 62 to corresponding cases 80. In this regard, the loads that are transmitted from the airfoil 68 into the platforms 64/66 are, in turn, transferred through the mechanical attachment features 78 and into the cases 80.

The illustrated arrangement divides functionality in that the airfoil 68 can primarily bear the relatively high temperatures and the platforms 64/66 can bear and transmit aerodynamic and other forces. In this regard, the airfoil 68 can be formed from high temperature materials, such as, but not limited to, ceramic materials and refractory metallic alloys. The platforms 64/66 can be formed of strong, ductile materials, such as, but not limited to, nickel- or cobalt-based superalloys. Examples of ceramic materials can include monolithic ceramics and ceramic matrix composites. An example of a refractory metallic alloy is a molybdenum-based alloy. Ceramic materials and refractory metallic alloys have good temperature resistance but may exhibit low ductility. Thus, the airfoil 68 can be formed of such high temperature materials, while the platforms 64/66 withstand higher stresses, such as those encountered in hooks or flanges for attachment to case structures, are formed of more ductile material.

The aerodynamic loads can be represented by directional load components, including radial, tangential, and axial load transmissions of the airfoil 68. The radial, tangential, and axial loads are primarily transmitted, respectively, in a radial load transmission direction, represented at R (see FIG. 2), a tangential load transmission direction, represented at T, and an axial load transmission direction, represented at AT. The axial load transmission direction AT is substantially parallel to the engine central axis A; the radial load transmission direction R is substantially perpendicular to the engine central axis A; and the tangential load transmission direction T is substantially tangent to the circular shape of the vane assembly 60. In this regard, as will be described in further detail below, the airfoil 68 includes load transmission features that are oriented substantially normal to, respectively, the radial, tangential, and axial load transmission directions such that the features bear the radial, tangential, and axial load transmissions of the airfoil 68. In other words, load transmission features aligned in these component directions can be used to react out that load.

Figure 4A:
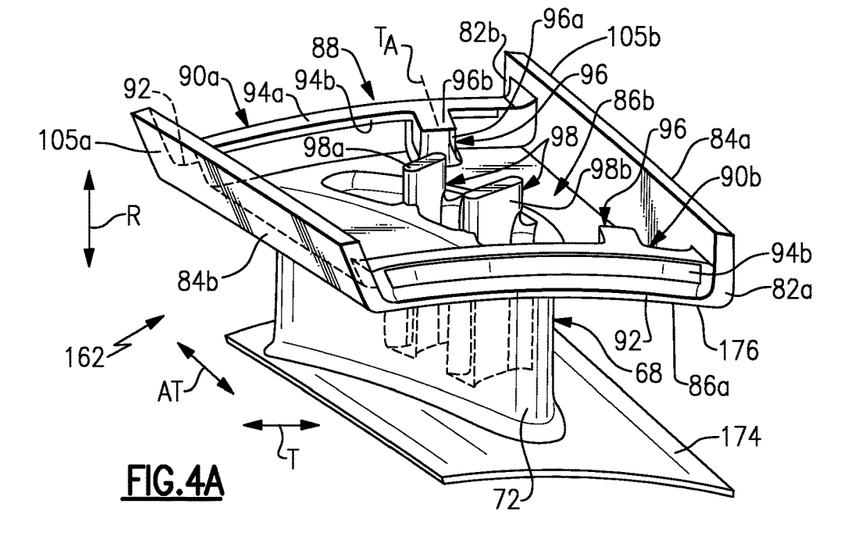
FIGS. 4A and 4B illustrates perspective views of an example van arc segment.
Figure 4B:
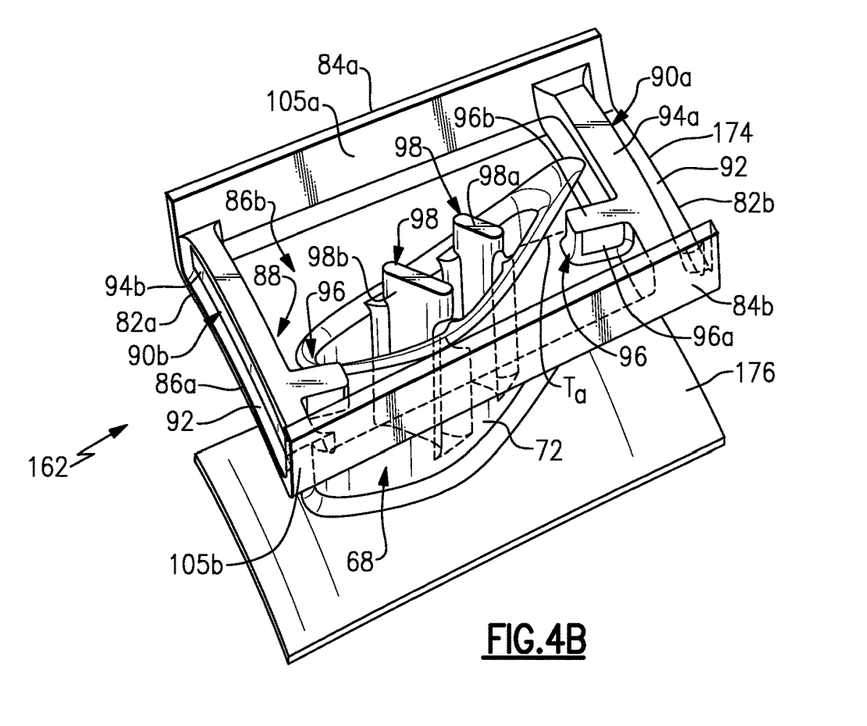

FIG. 4A illustrates another example vane arc segment 162 from a radially inward perspective view, and FIG. 4B shows the same vane arc segment 162 rotated about 180°. In as much as possible in this disclosure, like reference numerals designate like elements where appropriate and reference numerals with the addition one-hundred or multiples thereof designate modified elements that are understood to incorporate the same features and benefits of the corresponding elements. In this example, at least fairing platform 176 includes forward and aft sides 82a/82b, circumferential sides 84a/84b, and a gas path side 86a and an opposed radial side 86b. Although not shown, the fairing inner platform 174 could also include the same or similar features.

The radial side 86b of the fairing platform 176 includes a plurality of protrusions 88 that serve as the load-transmission features of the vane arc segment 162. Although only the fairing platform 176 is shown in this example as including such protrusions 88, it is to be understood that modified examples could additionally or alternatively include protrusions 88 on the other fairing platform 174. Also, the protrusions 88 on the platform fairing 174 can be different in geometry from protrusions on the platform fairing 176.

In this example, the protrusions 88 include first and second rails 90a/90b that extend circumferentially along the forward and aft sides 82a/82b of the respective fairing platforms 174/176. The first and second rails 90a/90b are axially offset from, respectively, edges 92 of the forward and aft sides 82a/82b, which allows the platforms 174/176 to fit against a mating structural feature of the platforms 64/66. Each of the first and second rails 90a/90b includes radial rail faces 94a that are oriented substantially normal to the radial load transmission direction R and axial rail faces 94b that are oriented substantially normal to the axial load transmission direction AT. The faces 94a/94b will contact corresponding faces on adjacent mating features of the platforms 64/66 to thus transmit, respectively, radial loads and axial loads into the platforms 64/66. The term "substantially" as used herein with reference to geometric orientation can refer to orientation within +/−10%, and in some examples +/−5% or +/−2%.

In the illustrated example, the protrusions 88 further include one or more tabs 96 that extend axially from one or more of the rails 90a/90b. In this example, the tabs 96 extend along a central tab axis $T_a$ that is substantially perpendicular to the respective rail 90a/90b. The tab 96 thus has circumferential tab faces 96a that are oriented substantially normal to the tangential load transmission direction T and a radial tab face 96b that is oriented substantially normal to the radial load transmission direction R. The faces 96a and 96b will contact corresponding faces on the respective platforms 64/66 to transmit, respectively, radial and tangential loads of the airfoil 68.

The load transmission faces of the protrusions 88 facilitate controlled-path transmission of loads of the airfoil 68 and additionally provide relatively low surface area for thermal transmission from the airfoil 68 into the platforms 64/66, to insulate the platforms 64/66. Additionally, the protrusions 88 are relatively short, to facilitate lowering tensile bending stresses.

In the illustrated example, the airfoil section 72 also includes one or more ribs 98 that extend in the hollow interior 72a of the airfoil section 72. The rib or ribs 98 protrude from the hollow interior 72a and thus can also serve as protrusions 88 through which loads can be transmitted from the airfoil 68. In this regard, the rib or ribs 98 can include a radial rib surface 98a that is oriented substantially normal to the radial load transmission direction R and axial rib faces 98b that are oriented substantially normal to the axial load transmission direction. In this regard, the rib or ribs 98 also serve to transmit radial and axial loads into the platforms 64/66.

Figure 5A:
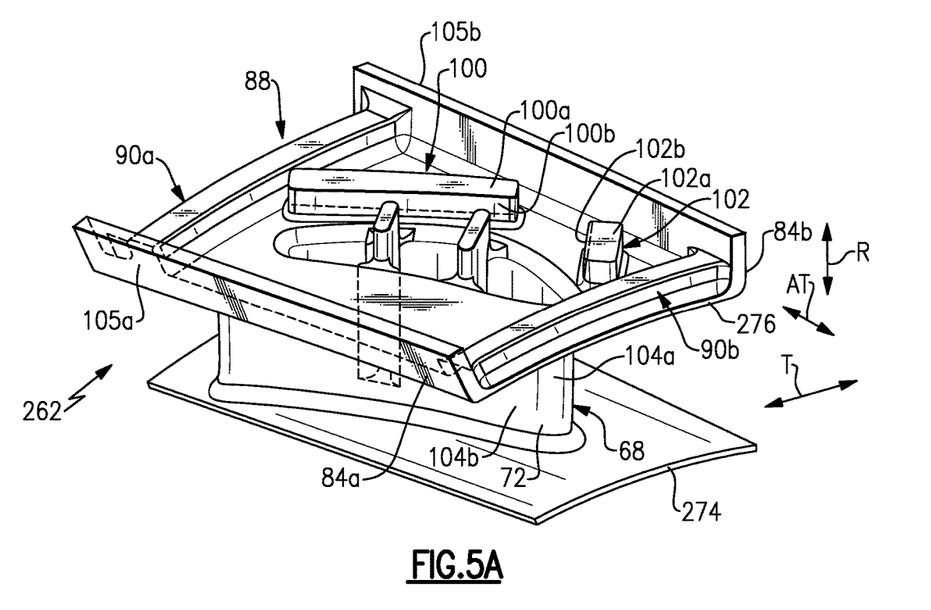
FIGS. 5A and 5B illustrate another example vane arc segment.
Figure 5B:
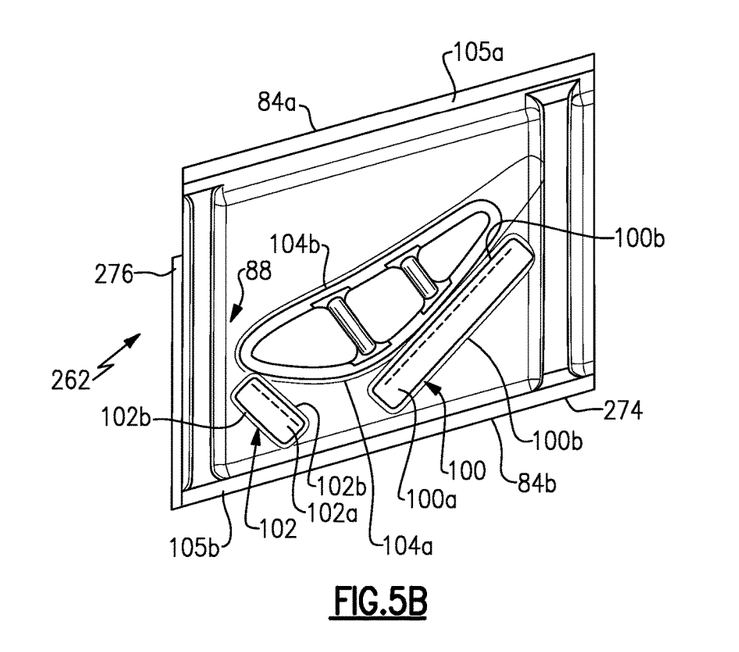

FIG. 5A shows another example vane arc segment 262 from a radially inward perspective view, and FIG. 5B shows the same vane arc segment 262 from a different angle and rotated about 180°. In this example, in addition to the rails 90a/90b, and instead of the tabs 96, the vane arc segment 262 includes first and second elongated tabs 100/102. The first elongated tab 100 extends in substantial radial alignment with a convex side 104a of the airfoil section 72 and serves as a primary load transmission tab. The convex side 104a is opposite a concave side 104b. The first elongated tab 100 includes a radial tab face 100a that is oriented substantially normal to the radial load transmission direction R and primary tab faces 100b that are oriented substantially normal to the in-plane (non-radial) aerodynamic resultant load. The tab face 100b adjacent the convex side 104a, represented along the dashed line in FIGS. 5A and 5B, is a retention face for assembly, while the opposite tab face 100b is a load face during engine operation. Similarly, the second elongated tab 102 includes a radial tab face 102a that is oriented substantially normal to the radially load transmission direction R. However, in this example, the first and second elongated tabs 100/102 run perpendicular to each other such that the second elongated tab 102 includes axial tab faces 102b that are oriented substantially normal to the in-plane axial load transmission direction AT. The tab face 102b adjacent the convex side 104a, represented along the dashed line in FIGS. 5A and 5B, is a retention face for assembly, while the opposite tab face 102b is a load face during engine operation. In this manner, the first and second elongated tabs 100/102 cooperate to transmit radial loads through the radial tab faces 100a/102a and transmit in-plane loads through, respectively, faces 100b/102b.

Additionally, each of the vane arc segments 162/262 can also include first and second mate face rails 105a/105b that extend axially along the circumferential sides 84a/84b of the respective fairing platforms 174/176/274/276. The mate face rails 105a/105b serve to seal the circumferential sides 84a/84b of the vane arc segments 162/262 to facilitate thermally shielding the platforms 64/66 and to facilitate reduction in thermal distortion of the platforms 64/66.

Figure 6:
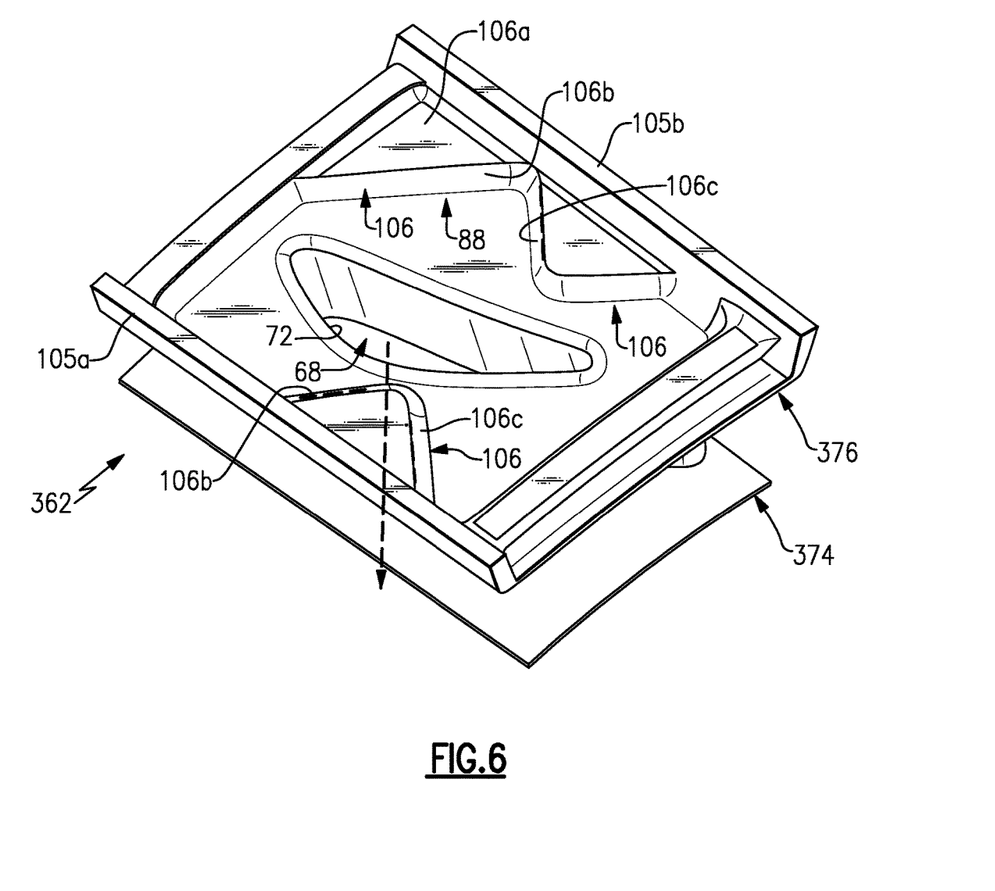
FIG. 6 illustrates another example vane arc segment.

FIG. 6 illustrates another example vane arc segment 362. In this example, the first mate face rail 105a, the second mate face rail 105b, or both, include one or more tabs 106 that extend circumferentially therefrom toward the airfoil section 72. Similar to the tabs 100/102 described above, the tabs 106 serve for load transmission from the airfoil 68. In this regard, one or more of the tabs 106 can include a radial tab face 106a that is substantially perpendicular to the radial load transmission direction R, one or more primary tab faces 106b that are oriented substantially perpendicular to the in-plane aerodynamic resultant load, and one or more secondary tab faces 106c that are substantially perpendicular to the primary tab faces 106b. In this example, the tabs 106 extend continuously from one or the other of the mate face rails 105a/105b rather than being individual, insular tabs on the radial side 86b of the respective fairing platform 374/376.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A vane arc segment comprising:
   radially inner and outer platforms; and
   an airfoil mechanically clamped between the platforms, the airfoil has an airfoil section that extends radially between radially inner and outer fairing platforms, at least one of the fairing platforms includes forward and aft sides, circumferential sides, and a gas path side and an opposed radial side, and the radial side includes a plurality of protrusions that have faces that are oriented substantially normal to, respectively, radial, tangential, and axial load transmission directions of the airfoil such that the faces, respectively, bear radial, tangential, and axial load transmissions of the airfoil; and
   wherein the plurality of protrusions includes first and second rails that extend circumferentially along the extent of the forward and aft sides.

2. The vane arc segment as recited in claim 1, wherein the plurality of protrusions include a tab that extends axially from the first rail.

3. The vane arc segment as recited in claim 2, wherein the tab extends along a central tab axis that is substantially perpendicular to the first rail such that the tab has circumferential tab faces that are oriented substantially normal to the tangential load transmission direction.

4. The vane arc segment as recited in claim 3, wherein the tab includes a radial tab face that is oriented substantially normal to the radial load transmission direction.

5. The vane arc segment as recited in claim 1, wherein the first and second rails are axially offset from, respectively, edges of the forward and aft sides.

6. The vane arc segment as recited in claim 1, wherein the first and second rails include radial rail faces that are oriented substantially normal to the radial load transmission direction and axial rail faces that are oriented substantially normal to the axial load transmission direction.

7. The vane arc segment as recited in claim 1, wherein the airfoil section includes a hollow interior and a rib that extends in the hollow interior and protrude from the hollow interior.

8. The vane arc segment as recited in claim 7, wherein the rib includes axial rib faces that are oriented substantially normal to the axial load transmission direction.

9. The vane arc segment as recited in claim 8, wherein the rib includes a radial rib face that is oriented substantially normal to the radial load transmission direction.

10. The vane arc segment as recited in claim 1, wherein the plurality of protrusions includes a first elongated tab that extends in radial alignment with a convex side of the airfoil section.

11. The vane arc segment as recited in claim 10, wherein the first elongated tab includes a radial tab face that is oriented substantially normal to the radial load transmission direction.

12. The vane arc segment as recited in claim 10, wherein the plurality of protrusions includes a second elongated tab that is substantially perpendicular to the first elongated tab.

13. The vane arc segment as recited in claim 1, wherein the plurality of protrusions includes first and second mateface rails that extend axially along the circumferential sides, and a tab that extends circumferentially toward the airfoil section from one of the first and second mateface rails.

14. The vane arc segment as recited in claim 13, wherein the tab includes a radial tab face that is oriented substantially normal to the radial load transmission direction and an axial tab face that is oriented substantially normal to the axial load transmission direction.

15. A vane assembly comprising:
a plurality of vane arc segments that are arrangeable into an annular configuration, each of the vane arc segments includes:
radially inner and outer platforms, and
an airfoil mechanically clamped between the platforms, the airfoil has an airfoil section that extends radially between radially inner and outer fairing platforms, at least one of the fairing platforms includes forward and aft sides, circumferential sides, and a gas path side and an opposed radial side, and the radial side includes a plurality of protrusions that have faces that are oriented substantially normal to, respectively, radial, tangential, and axial load transmission directions of the airfoil such that the faces, respectively, bear radial, tangential, and axial load transmissions of the airfoil wherein the plurality of protrusions includes first and second rails that extend circumferentially along the extent of the forward and aft sides.

16. A gas turbine engine comprising:
a core engine that includes a compressor section, a combustor in fluid communication with the compressor section, a turbine section in fluid communication with the combustor, and a vane assembly that includes a plurality of vane arc segments arranged in an annular configuration in a core gas path of the core engine, each of the vane arc segments includes:
radially inner and outer platforms, and
an airfoil mechanically clamped between the platforms, the airfoil has an airfoil section that extends radially between radially inner and outer fairing platforms, at least one of the fairing platforms includes forward and aft sides, circumferential sides, and a gas path side and an opposed radial side, and the radial side includes a plurality of protrusions that have faces that are oriented substantially normal to, respectively, radial, tangential, and axial load transmission directions of the airfoil such that the faces, respectively, bear radial, tangential, and axial load transmissions of the airfoil, wherein the plurality of protrusions includes first and second rails that extend circumferentially along the extent of the forward and aft sides.

* * * * *